(12) United States Patent
Morisada et al.

(10) Patent No.: US 7,539,246 B2
(45) Date of Patent: May 26, 2009

(54) IMAGE ENCODING APPARATUS AND METHOD

(75) Inventors: Hidehiko Morisada, Tokyo (JP); Makoto Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 1049 days.

(21) Appl. No.: 10/398,540

(22) PCT Filed: Aug. 6, 2002

(86) PCT No.: PCT/JP02/08035

§ 371 (c)(1),
(2), (4) Date: Oct. 9, 2003

(87) PCT Pub. No.: WO03/017674

PCT Pub. Date: Feb. 27, 2003

(65) Prior Publication Data

US 2004/0062528 A1 Apr. 1, 2004

(30) Foreign Application Priority Data

Aug. 9, 2001 (JP) ............................. 2001-241542

(51) Int. Cl.
 H04N 7/12 (2006.01)
 H04N 11/02 (2006.01)
 H04N 11/04 (2006.01)
 H04B 1/66 (2006.01)
(52) U.S. Cl. ................................. 375/240.03
(58) Field of Classification Search ................. None
See application file for complete search history.

(56) References Cited

U.S. PATENT DOCUMENTS 5,535,138 A 7/1996 Keith
5,568,199 A 10/1996 Kajimoto et al.
5,640,208 A * 6/1997 Fujinami ............... 375/240.14
6,100,940 A 8/2000 Dieterich
6,115,421 A 9/2000 Katta et al.
6,504,576 B2 * 1/2003 Kato ....................... 348/423.1
6,922,442 B2 * 7/2005 Morita et al. .......... 375/240.03
2002/0015513 A1 * 2/2002 Ando et al. ................. 382/107

FOREIGN PATENT DOCUMENTS

| EP | JP 0 599 258 | 6/1994 |
| EP | 0 804 035 | 10/1997 |
| EP | 0 828 393 | 3/1998 |
| GB | 2 342 525 | 4/2000 |
| JP | 6-165151 | 6/1994 |
| JP | 8-65683 | 3/1996 |
| JP | 9-294267 | 11/1997 |
| WO | WO 99 59344 | 11/1999 |

* cited by examiner

*Primary Examiner*—Nhon T Diep
(74) *Attorney, Agent, or Firm*—Frommer Lawrence & Haug LLP; William S. Frommer; Thomas F. Presson

(57) ABSTRACT

An image coding apparatus which improves the picture quality of an image. A quantization index arithmetic operation section calculates, based on motion vector residuals of macro block and the sum total of the motion vector residual outputted from a motion vector residual buffer section, a weighted average of the motion vector residual. The quantization index arithmetic operation section calculates, based on the value of activity of the macro block and the sum total of the activity outputted from an activity buffer section, a weighted average of the activity. The quantization index arithmetic operation section calculates a quantization index based on the weighted average of the vector residual or the weighted average of the activity.

6 Claims, 7 Drawing Sheets

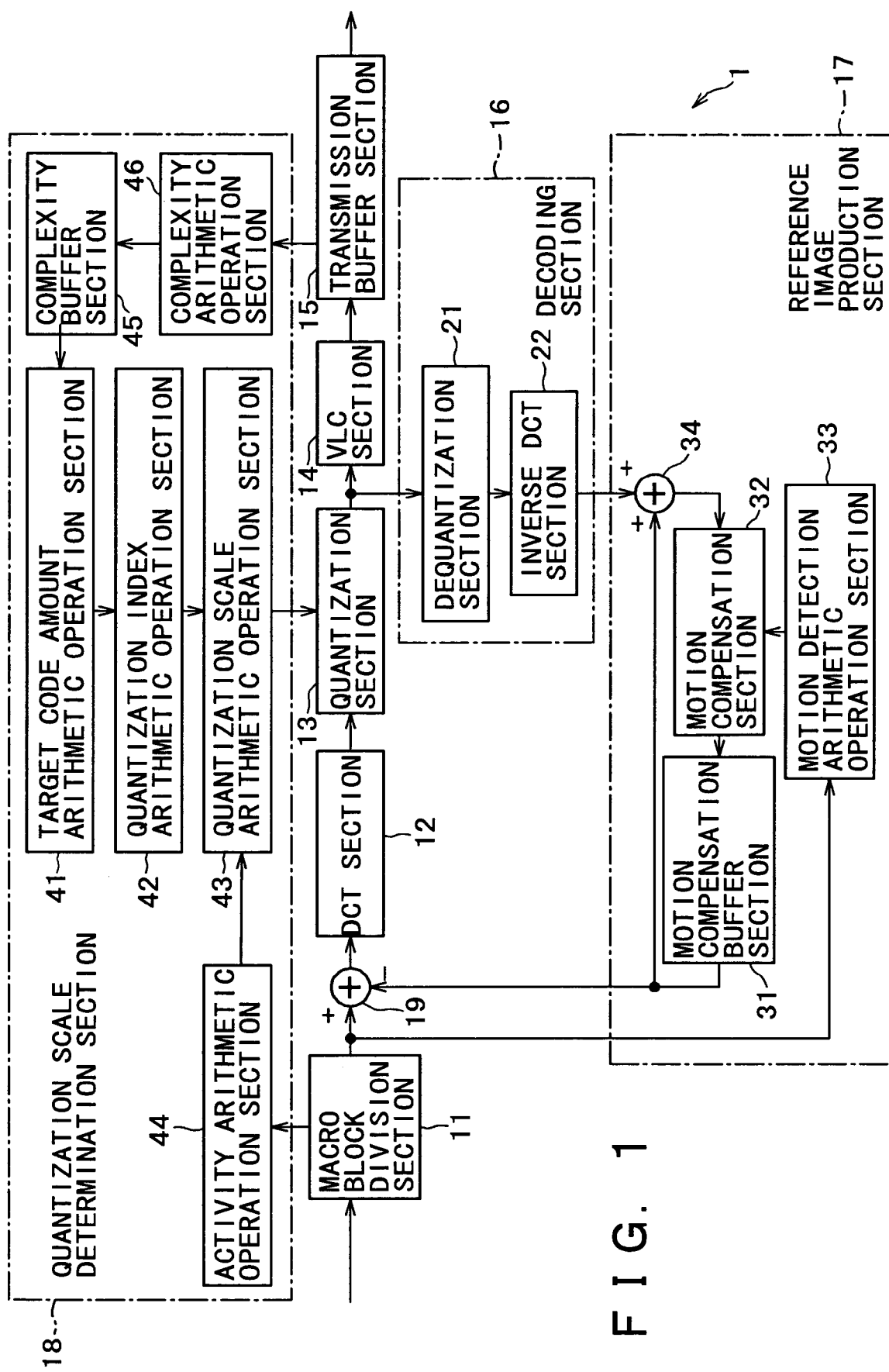
F I G. 1

F I G. 2
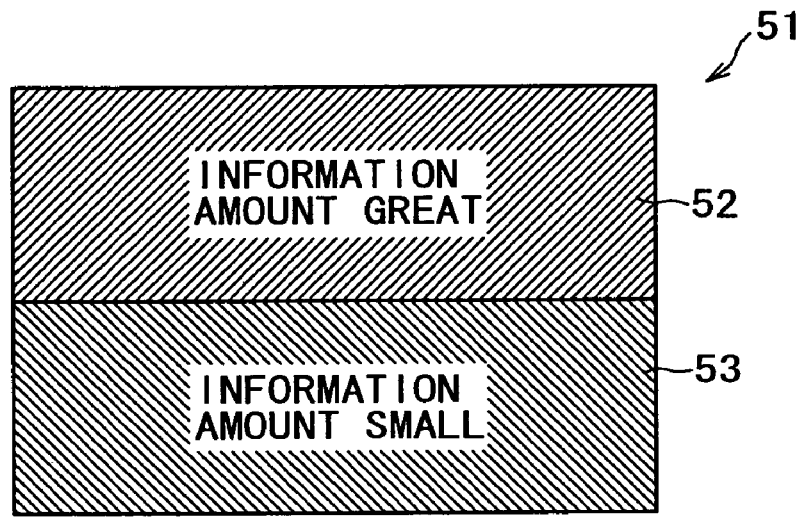
F I G. 3
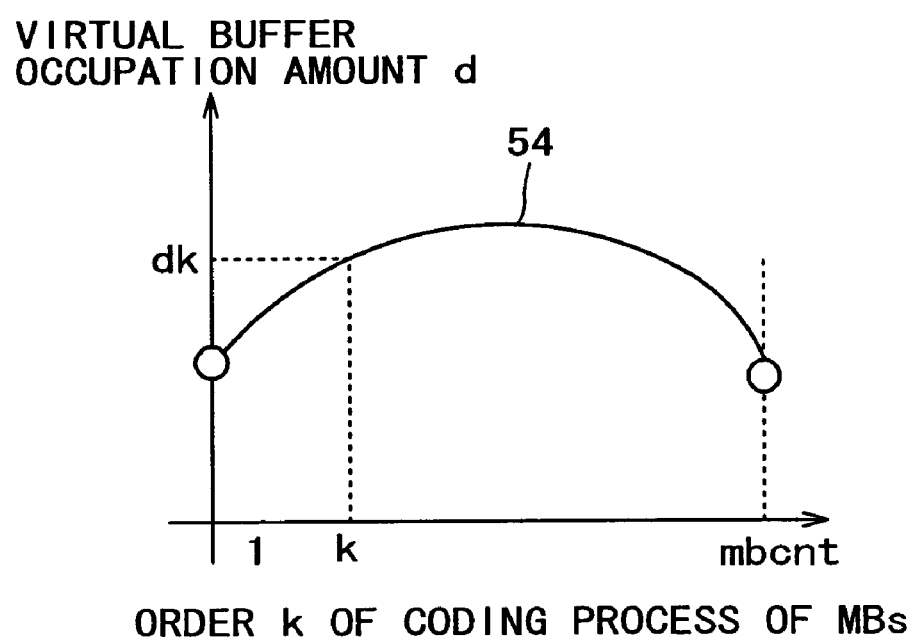

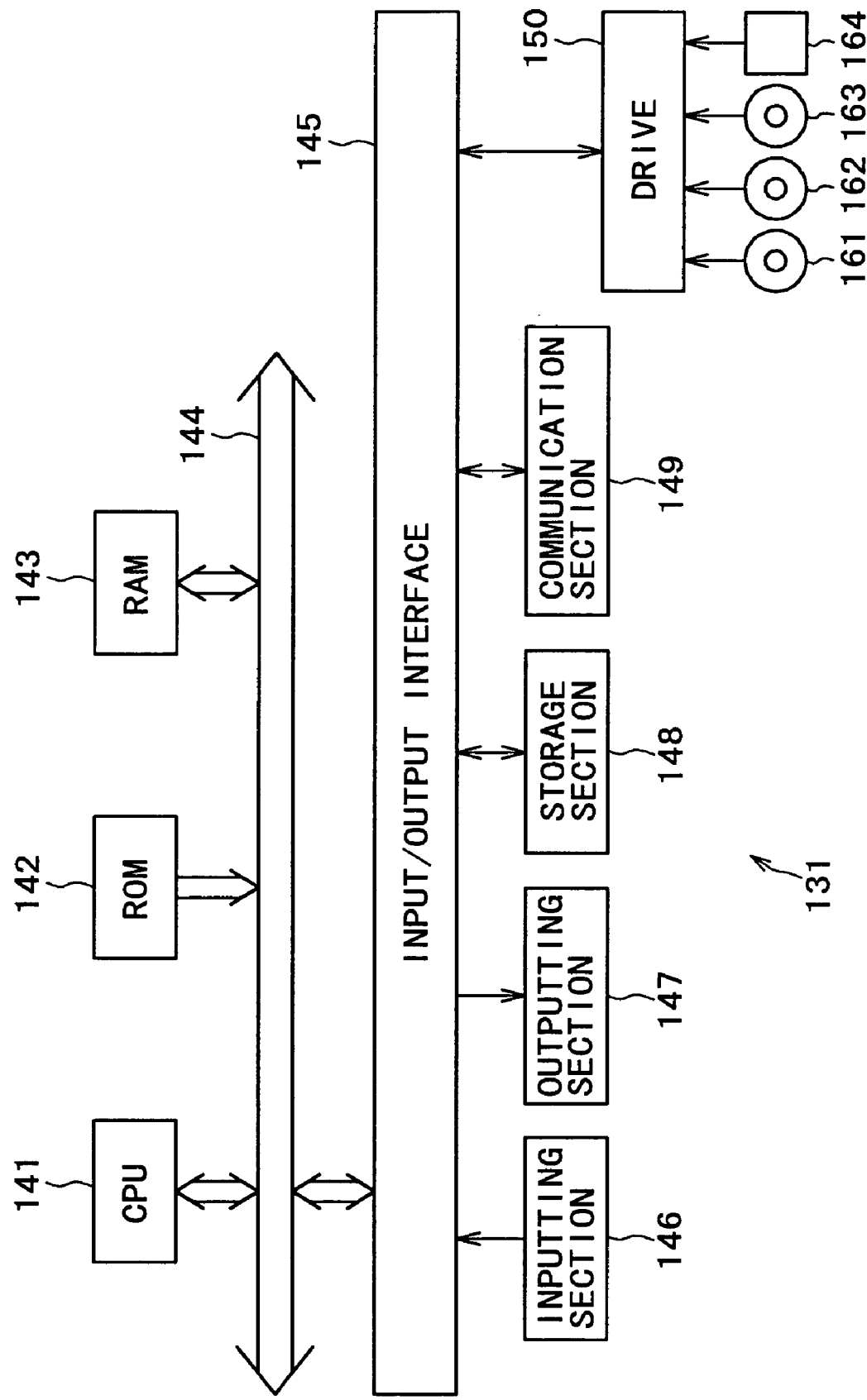

IMAGE ENCODING APPARATUS AND METHOD

TECHNICAL FIELD

This invention relates to an image coding apparatus and method, and more particularly to an image coding apparatus and method by which the picture quality of an image can be improved.

BACKGROUND ART

Recently, an image compression technique represented by the MPEG (Moving Picture Experts Group) has been being developed.

FIG. 1 shows a configuration of a conventional image coding apparatus 1 which uses such MPEG as mentioned above.

Referring to FIG. 1, a macro block division section 11 receives frame data as an input thereto, converts the frame data into data of a macro block (hereinafter referred to as MB), and outputs the data of the MB obtained by the conversion to a subtraction section 19, a quantization scale determination section 18 and a reference image production section 17.

The subtraction section 19 subtracts reference image data inputted from the reference image production section 17 from the data of the MB inputted from the macro block division section 11 (namely, the subtraction section 19 adds the reference image data in the reversed polarity to the data of the MB) and outputs difference data to a DCT section 12.

The DCT section 12 performs a DCT (Discrete Consign Transform) process for the difference data inputted from the subtraction section 19 to convert them into DCT coefficients and outputs the DCT coefficients to a quantization section 13.

The quantization section 13 quantizes the DCT coefficients inputted from the DCT section 12 with a quantization scale inputted from a quantization scale determination section 18 and outputs resulting values to a VLC section 14 and a decoding section 16.

The VLC section 14 performs a variable length coding process for the quantized data inputted from the quantization section 13 to convert the data into a VLC (Variable Length Code) and outputs the VLC to a transmission buffer section 15.

The transmission buffer section 15 outputs the VLC inputted thereto to the quantization scale determination section 18. Meanwhile, the transmission buffer section 15 converts, when the VLCs of the entire frame are inputted thereto, the VLCs into data in a unit of a frame and outputs the data as bit stream data to the outside.

In the decoding section 16, a dequantization section 21 dequantizes the quantized data inputted from the quantization section 13 and outputs resulting data to an inverse DCT section 22.

The inverse DCT section 22 performs an inverse DCT process for the dequantized data inputted from the dequantization section 21 into original image data and outputs the original image data to an addition section 34 of the reference image production section 17.

In the reference image production section 17, the addition section 34 adds image data inputted from the inverse DCT section 22 and reference image data, which is inputted from a motion compensation buffer section 31 and corresponding to the image data, and outputs resulting data to the motion compensation buffer section 31 through a motion compensation section 32.

The motion compensation buffer section 31 stores the image data inputted from the addition section 34 through the motion compensation section 32 as predictive image data for a next frame.

A motion detection arithmetic operation section 33 detects a motion vector corresponding to the MB inputted from the macro block division section 11 and outputs the motion vector to the motion compensation section 32.

The motion compensation section 32 performs a process for motion compensation, based on the motion vector inputted from the motion vector arithmetic operation section 33. In particular, the motion compensation section 32 reads out reference image data, which is corresponding to the data of the MB inputted to the subtraction section 19, from among the predictive image data stored in advance in the motion compensation buffer section 31, based on the motion vector inputted from the motion detection arithmetic operation section 33, and outputs the reference image data to the subtraction section 19.

In the quantization scale determination section 18, a complexity arithmetic operation section 46 calculates, based on the VLC inputted from the transmission buffer section 15, a complexity as a parameter representative of complicacy of the VLC and outputs the complexity to a complexity buffer section 45.

The complexity buffer section 45 temporarily stores the complexity inputted from the complexity arithmetic operation section 46 and suitably outputs the complexity to a target code amount arithmetic operation section 41.

The target code amount arithmetic operation section 41 calculates a target code amount based on the complexity inputted from the complexity buffer section 45 and outputs the target code amount to a quantization index arithmetic operation section 42.

The quantization index arithmetic operation section 42 calculates a quantization index based on the target code amount inputted from the target code amount arithmetic operation section 41 and outputs the quantization index to a quantization scale arithmetic operation section 43.

An activity arithmetic operation section 44 calculates an activity as a parameter representative of complicacy of data of each of the MBs inputted from the macro block division section 11 and outputs the activity to the quantization scale arithmetic operation section 43.

The quantization scale arithmetic operation section 43 calculates a quantization scale based on the quantization index inputted from the quantization index arithmetic operation section 42 and the activity inputted from the activity arithmetic operation section 44 and outputs the quantization scale to the quantization section 13.

Subsequently, operation of the image coding apparatus 1 is described.

Frame data are inputted to the macro block division section 11 and converted into data in a unit of an MB and then outputted to the subtraction section 19.

Reference image data inputted from the reference image production section 17 to the subtraction section 19 are subtracted from the data of the MB inputted to the subtraction section 19, and data of the difference between them is outputted to the DCT section 12.

The difference data inputted to the DCT section 12 is converted into a DCT coefficient, and the DCT coefficient is outputted to the quantization section 13. The DCT coefficient inputted to the quantization section 13 is quantized based on a quantization scale inputted from the quantization scale arithmetic operation section 43 to the quantization section 13 and then inputted to the VLC section 14.

The quantized data inputted to the VLC section 14 is converted into a VLC, and the VLC is outputted to the transmission buffer section 15.

The VLC inputted to the transmission buffer section 15 is outputted to the complexity arithmetic operation section 46. When VLCs of the entire frame are inputted to the transmission buffer section 15, the VLCs are converted into data in a unit of a frame, and the data are outputted as bit stream data to the outside.

The quantized data inputted from the quantization section 13 to the dequantization section 21 is dequantized and outputted to the inverse DCT section 22. The dequantized data inputted to the inverse DCT section 22 is converted back into original image data, and the original image data is outputted to the addition section 34.

The image data inputted to the addition section 34 is added to the reference image data (that is, reference image data obtained by the subtraction from the data of the MB by the subtraction section 19) stored in the motion compensation buffer section 31 in advance and then decoded.

The decoded data of the MB is inputted to the motion compensation buffer section 31 through the motion compensation section 32 and stored as predictive image data of an MB of a frame to be processed subsequently.

The motion detection arithmetic operation section 33 detects a motion vector corresponding to the data of the MB inputted from the macro block division section 11 and outputs the motion vector to the motion compensation section 32.

By the motion compensation section 32, a process of motion compensation corresponding to the motion vector inputted from the motion detection arithmetic operation section 33 is performed. In particular, from within the predictive image data stored in advance in the motion compensation buffer section 31, the predictive image data at a position displaced by an amount corresponding to the motion vector from the position of the MB is read out, and the predictive image data is outputted as reference image data for the MB to the subtraction section 19.

The quantization scale determination section 18 performs the following three process, that is, so-called TM5 (Test Model 5) processes of the MPEG to calculate a quantization scale of the MB and outputs the quantization scale of the MB to the quantization section 13.

(Step 1)

The target code amount arithmetic operation section 41 calculates, based on the value of the complexity of the VLC of the MB inputted from the complexity buffer section 45 and processed at the k-th (the MB processed at the k-1th is hereinafter referred to as MB-k-1), a target code amount for the MB-k, and outputs the target code amount to the quantization index arithmetic operation section 42.

(Step 2)

The quantization index arithmetic operation section 42 calculates a virtual buffer occupation amount of the MB-k, based on the target code amount for the MB-k inputted from the target code amount 41.

Further, the quantization index arithmetic operation section 42 calculates a quantization index of the MB-k based on the virtual buffer occupation amount of the MB-k and outputs the quantization index of the MB-k to the quantization scale arithmetic operation section 43.

(Step 3)

The quantization scale arithmetic operation section 43 calculates a quantization scale, based on the quantization index of the MB-k inputted from the quantization index arithmetic operation section 42 and the value of the activity of the MB-k inputted from the activity arithmetic operation section 44, and outputs the quantization scale to the quantization section 13.

At (step 2) of the TM5 described above, the quantization index (hereinafter referred to as Q-k) of the MB-k is calculated in accordance with the following two expressions:

$$d\text{-}k = d0 + Bk\text{-}1 - (Tk \times (k-1)/mbcnt \quad (1)$$

$$Q\text{-}k = d\text{-}k \times 31/r \quad (2)$$

The expression (1) is an expression for determining the virtual buffer occupation amount (hereinafter referred to as d-k) of the MB-k.

d0 represents an initial virtual buffer occupation amount at the top of the frame; Bk-1 represents the generation bit amount up to the preceding MB, that is, the MB-k-1; mbcnt represents the total number of MBs per one frame; and Tk represents the target code amount for the MB-k.

The expression (2) is an expression for determining the quantization index Q-k of the MB-k.

r represents a parameter for adjusting the speed of response of feedback of the quantization scale determination section 18 and is called reaction parameter.

The quantization indices of the MBs calculated in accordance with such expressions (1) and (2) as given above have the following problem.

In particular, the quantization indices of the MBs calculated by the feedback loop of the quantization scale determination section 18 are calculated based on the prerequisite that the generation code amounts of the MBs are all equal to each other.

As a result, there is a problem that, where the generation code amounts of the MBs are not equal to each other, the quantization indices in the frame are not stabilized.

For example, it is assumed that a frame 51 of FIG. 2 is divided into totaling mbcnt MBs composed of an MB group 52 having a large amount of information, that is, a large amount of bit generation and another MB group 53 having a small amount of bit generation.

Then, it is assumed that the data of the MB-1 to MB-mbcnt obtained by the conversion are coded by the image coding apparatus 1 of FIG. 1.

In this instance, the d-1 to d-mbcnt (virtual buffer occupation amounts of the MB-1 to MB-mbcnt) calculated in accordance with the expression (1) given hereinabove are such as indicated by a curve 54 of FIG. 3.

It is to be noted that the axis of ordinate of FIG. 3 indicates the virtual buffer occupation amount d and the axis of abscissa represents the order k (k ranges from 1 to mbcnt) of the coding process of the MBs.

In particular, as seen from the curve 54 of FIG. 3, in the front half of the coding process (where k is small), the virtual buffer occupation amount d-k increases in accordance with the processing order (as k increases). On the other hand, in the latter half of the coding process (where k is great), the virtual buffer occupation amount d-k decreases in accordance with the processing order (as k increases toward the mbcnt).

Accordingly, since the quantization index Q-k increases in proportion to the virtual buffer occupation amount d-k as indicated by the expression (2) given hereinabove, the calculated quantization indices, Q-1 to Q-mbcnt, have values dispersed, depending upon the value of k.

In other words, the quantization indices of the MBs calculated by the image coding apparatus 1 are not stable within the frame.

As a result, the visual perceptibility, that is, the picture quality, of the frame coded by the image coding apparatus 1 of FIG. 1 is degraded.

DISCLOSURE OF THE INVENTION

The present invention has been made taking such a situation as described above into consideration and makes it possible to improve the picture quality of an image.

An image coding apparatus of the present invention is characterized in that the image coding apparatus comprises first arithmetic operation means for calculating value of a parameter representative of complicacy of block, storage means for storing the value of the parameter calculated by the first arithmetic operation means, and second arithmetic operation means for calculating a weighted average of the value of the parameter stored by the storage means and calculating a quantization index of the block based on the weighted average.

In the image coding apparatus of the present invention, the parameter may be an activity representative of complicacy of the block.

In the image coding apparatus of the present invention, the parameter may be a motion vector residual of the block.

Further, the first arithmetic operation means may determine, where the value of the motion vector residual is higher than a predetermined threshold value set in advance, the threshold value as the value of the motion vector residual.

Alternatively, the first arithmetic operation means may determine, where the frame of the screen includes block which do not use a motion vector and block which use a motion vector, a predetermined fixed value set in advance as the motion vector residual of the block which does not use a motion vector.

In the image coding apparatus of the present invention, where the frame of the screen includes block which does not use a motion vector and block which uses a motion vector, the first arithmetic operation means may calculate an activity of the block as the parameter of the block which does not use a motion vector, and calculate a motion vector residual of the block as the parameter of the block which uses a motion vector.

An image coding method of the present invention is characterized in that the image coding method comprises a first arithmetic operation step of calculating value of a parameter representative of complicacy of block, a storage step of storing the value of the parameter calculated by the process at the first arithmetic operation step, and a second arithmetic operation step of calculating a weighted average of the value of the parameter stored by the process at the storage step and calculating a quantization index of the block based on the weighted average.

A program of a recording medium of the present invention is characterized in that the program comprises a first arithmetic operation step of calculating value of a parameter representative of complicacy of block, a storage step of storing the value of the parameter calculated by the process at the first arithmetic operation step, and a second arithmetic operation step of calculating a weighted average of the value of the parameter stored by the process at the storage step and calculating a quantization index of the block based on the weighted average.

A program of the present invention is characterized in that the program causes a computer to execute a first arithmetic operation step of calculating value of a parameter representative of complicacy of block, a storage step of storing the value of the parameter calculated by the process at the first arithmetic operation step, and a second arithmetic operation step of calculating a weighted average of the value of the parameter stored by the process at the storage step and calculating a quantization index of the block based on the weighted average.

In the image coding apparatus and method, recording medium and program of the present invention, a quantization index of a block is calculated based on a weighted average of a parameter representative of complicacy of the block.

BRIEF DESCRIPTION OF THE DRAWINGS

FIG. 1 is a block diagram showing an example of a configuration of a conventional image coding apparatus;

FIG. 2 is a view showing an example of a configuration of a frame;

FIG. 3 is a view illustrating an example of a virtual buffer occupation amount of the frame of FIG. 2 calculated by the image coding apparatus of FIG. 1;

FIG. 9 is a block diagram showing another example of a configuration of the image coding apparatus to which the present invention is applied.

BEST MODE FOR CARRYING OUT THE INVENTION

Figure 4:
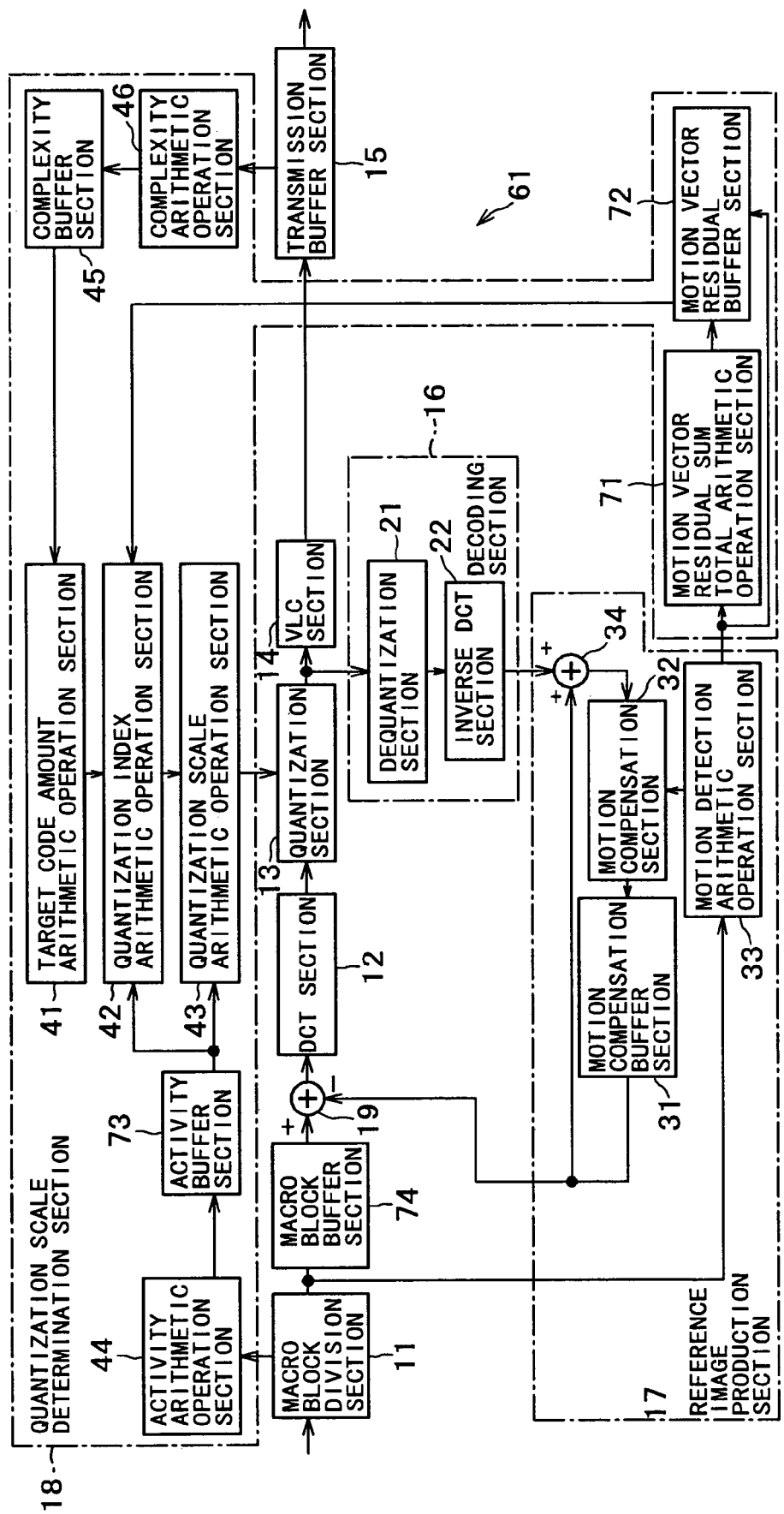
FIG. 4 is a block diagram showing an example of a configuration of an image coding apparatus to which the present invention is applied.

FIG. 4 shows an example of a configuration of an image coding apparatus 61 to which the present invention is applied. Elements which correspond to those of the conventional image coding apparatus 1 of FIG. 1 are denoted by the same reference numerals, and description of them is suitably omitted.

As shown in FIG. 4, the image coding apparatus 61 includes, in addition to the components of the image coding apparatus 1 of FIG. 1, a motion vector residual sum total arithmetic operation section 71, a motion vector residual buffer section 72, an activity buffer section 73 and a macro block buffer section 74.

In the example of FIG. 4, when compared with the conventional example of FIG. 1, the motion detection arithmetic operation section 33 detects a motion vector corresponding to data of each of MBs inputted from the macro block division section 11 (a motion vector of an MB) and outputs the motion vector to the motion compensation section 32. Further, the motion detection arithmetic operation section 33 calculates a motion vector residual of each MB and outputs the motion vector residual to the motion vector residual sum total arithmetic operation section 71 and the motion vector residual buffer section 72.

The motion vector residual sum total arithmetic operation section 71 calculates the sum total of the motion vector residuals of the MBs inputted from the motion detection arithmetic operation section 33 and outputs the sum total to the motion vector residual buffer section 72.

The motion vector residual buffer section 72 temporarily stores the sum total of the motion vector residuals of the MBs inputted from the motion vector residual sum total arithmetic operation section 71 and the motion vector residuals of the MBs inputted from the motion detection arithmetic operation section 33 and suitably outputs them to the quantization index arithmetic operation section 42.

The activity arithmetic operation section 44 calculates an activity corresponding to the data of each of the MBs inputted from the macro block division section 11 (an activity of each MB) and further calculates the sum total of the activities of the MBs. Then, the activity arithmetic operation section 44 outputs the activities of the MBs and the sum total of the activities of the MBs to the activity buffer section 73.

The activity buffer section 73 temporarily stores the activities of the MBs and the sum total of the activities of the MBs inputted from the activity arithmetic operation section 44 and suitably outputs them to the quantization index arithmetic operation section 42 and the quantization scale arithmetic operation section 43.

The macro block buffer section 74 temporarily stores the data of the MBs inputted from the macro block division section 11 and suitably outputs them to the subtraction section 19.

The other configuration is similar to that in the case of FIG. 1.

Figure 5:
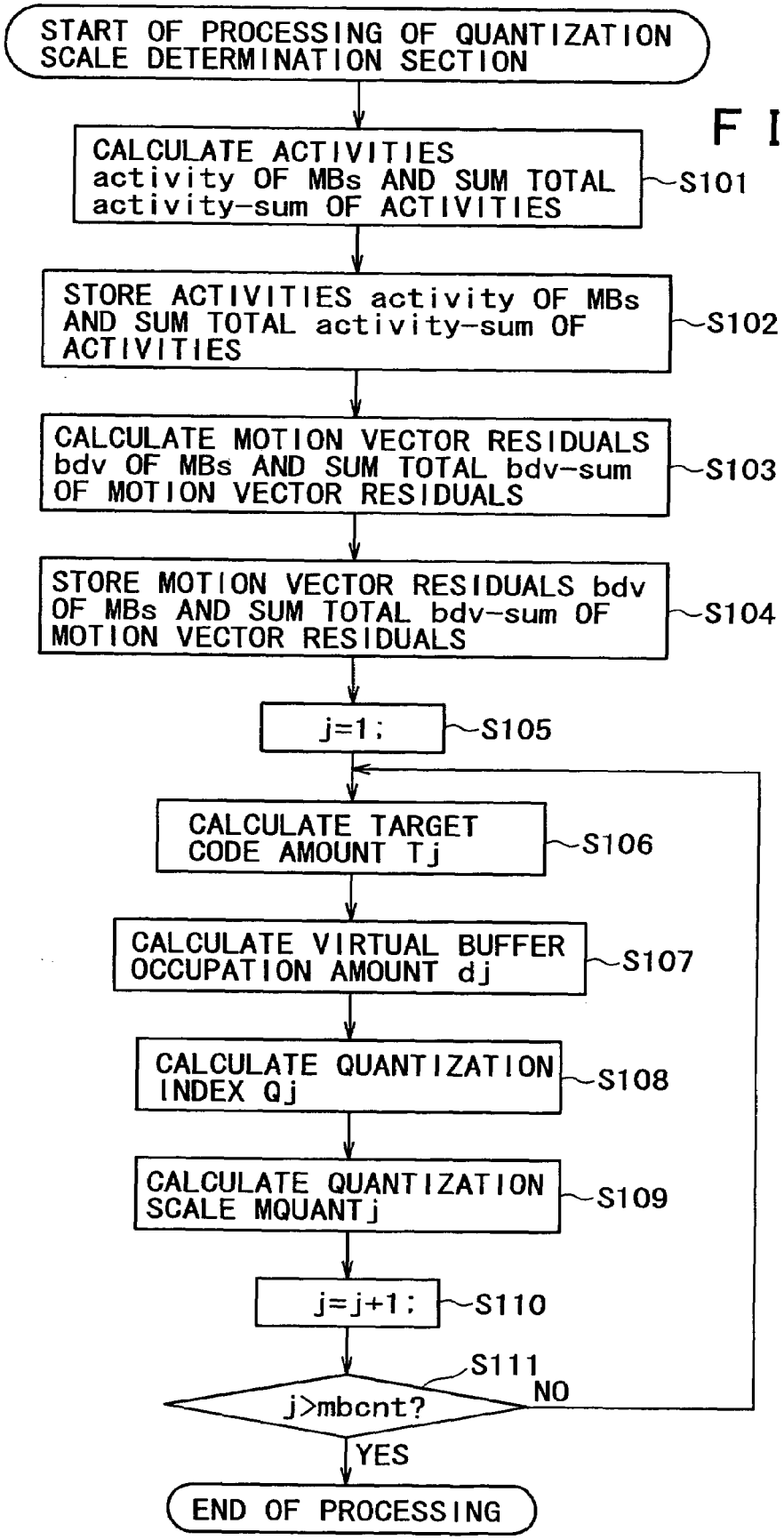
FIG. 5 is a flow chart illustrating a process of a quantization scale determination section of the image coding apparatus of FIG. 4.

Subsequently, operation of the quantization scale determination section 18 of the image coding apparatus 61 of FIG. 4 is described with reference to a flow chart of FIG. 5 (since the other process is similar to that in the case of FIG. 1, description thereof is omitted).

As described hereinabove, the macro block division section 11 receives frame data as an input thereto and converts the inputted frame data into data of MBs.

In the present example, frame data of one frame are converted into data of mbcnt MBs.

The macro block division section 11 outputs the data of the MB-1 to MB-mbcnt in order to the macro block buffer section 74, activity arithmetic operation section 44 and motion detection arithmetic operation section 33.

At this time, the activity arithmetic operation section 44 calculates, based on the data of the MB-1 to MB-mbcnt inputted from the macro block division section 11, activities of them (the activity of the MB-k is hereinafter referred to as activity-k) at step S101 of FIG. 5.

Further, the activity arithmetic operation section 44 calculates the sum total of the activity-1 to activity-mbcnt (the sum total is hereinafter referred to as activity-sum), and outputs the activities activity-k1 to activity-mbcnt and the sum total activity-sum of the activities to the activity buffer section 73.

At step S102, the activity buffer section 73 stores the activities activity-1 to activity-mbcnt and the sum total activity-sum of the activities inputted from the activity arithmetic operation section 44.

On the other hand, the motion detection arithmetic operation section 33 calculates, based on the data of the MB-1 to MB-mbcnt inputted from the macro block division section 11, motion vector residuals of them (the motion vector residual of the MB-k is hereinafter referred to as bdv-k) in such a manner as described hereinabove, and outputs them to the motion vector residual sum total arithmetic operation section 71 and the motion vector residual buffer section 72.

It is to be noted that, in the present example, the motion detection arithmetic operation section 33 calculates the motion vector residual bdv-k of the MBk in the following manner.

In particular, where the motion vector residuals in the forward direction and the backward direction are represented by bdv-k_fwd and bdv-k_bwd, respectively, when the prediction type is the forward prediction, the motion detection arithmetic operation section 33 calculates the motion vector residual bdv-k of the MBk as bdv-k=bdv-k_fwd; when the prediction type is the backward prediction, the motion detection arithmetic operation section 33 calculates the motion vector residual bdv-k of the MBk as bdv-k=bdv-k_bwd; and when the prediction type is the bi-directional prediction, the motion detection arithmetic operation section 33 calculates the motion vector residual bdv-k of the MBk as bdv-k=(bdv-k_fwd+bdv-k_bwd)/2.

At step S103, the motion vector residual sum total arithmetic operation section 71 calculates the sum total (hereinafter referred to as bdv-sum) of the motion vector residuals bdv-1 to bdv-mbcnt inputted from the motion detection arithmetic operation section 33, and outputs the sum total bdv-sum to the motion vector residual buffer section 72.

At step S104, the motion vector residual buffer section 72 stores the motion vector residuals bdv-1 to bdv-mbcnt inputted from the motion detection arithmetic operation section 33 and the sum total bdv-sum of the motion vector residuals inputted from the motion vector residual sum total arithmetic operation section 71.

It is to be noted that, if the processes at steps S101 to S104 come to an end prior to the processing of coding the data of the MB1, then the order of the processes at steps S101 and S102 and at steps S103 and S104 is not limited.

When the processes at steps S101 to S104 are completed, the count value of a counter (not shown) is initialized to 1 at step S105.

Thereafter, if a quantization scale for the MB-j (hereinafter referred to as MQUANT-j) is calculated by processes at steps S106 to S109 by the quantization scale determination section 18, then the counter increments the count value j only by one at step S110.

It is to be noted that details of the processes at steps S106 to S109 are hereinafter described.

Then at step S111, a discrimination section (not shown) of the quantization scale determination section 18 discriminates whether or not the count value j exceeds the mbcnt.

If it is discriminated at step S111 that the count value j exceeds the mbcnt, then the quantization scale determination section 18 ends its processing.

On the other hand, if it is discriminated at step S111 that the count value j does not exceed the mbcnt (if it is discriminated that the count value j is equal to or less than the mbcnt), then the quantization scale determination section 18 returns its processing to step S106 to repeat the processes beginning with step S106.

For example, if the count value j is j=k, then the quantization scale determination section 18 calculates the quantization scale MQUANT-k by the processes at steps S106 to S109 as described above.

In particular, at step S106, the target code amount arithmetic operation section 41 calculates a target code amount (hereinafter referred to as Tk) of the MB-k based on the complexity supplied from the complexity buffer section 45 and outputs the target code amount to the quantization index arithmetic operation section 42.

At step S107, the quantization index arithmetic operation section 42 calculates a virtual buffer occupation amount (hereinafter referred to as d-k) of the MB-k in the following manner based on the target code amount Tk inputted from the target code amount arithmetic operation section 41, and the motion vector residuals bdv-1 to bdv-k-1 and the sum total bdv-sum of the motion vector residuals inputted from the motion vector residual buffer section 72.

It is to be noted, however, that it is assumed that, in the present example, a frame is composed only of MBs which use a motion vector (such an MB is hereinafter referred to as interMB).

First, the quantization index arithmetic operation section 42 calculates the sum total of the motion vector residuals of those MBs processed already in the frame inputted from the motion vector residual buffer section 72, that is, the sum total (hereinafter referred to as bdv-sum_pk-1) from the bdv-1 to bdv-k-1.

Then, the quantization index arithmetic operation section 42 calculates the virtual buffer occupation amount d-k in accordance with the following expression (3):

$$d\text{-}k = d0 + Bk\text{-}1 - (Tk \times bdvsun\_pk\text{-}1/bdv\text{-sum}) \quad (3)$$

It is to be noted that, similarly as in the expression (1) given hereinabove, d0 represents an initial virtual buffer occupation amount at the top of the frame, and Bk-1 represents an amount of bit generation up to the MB-k-1.

At step S108, the quantization index arithmetic operation section 42 calculates a quantization index (hereinafter referred to as Q-k) of the MB-k in accordance with the expression (2) given hereinabove and outputs the quantization index to the quantization scale arithmetic operation section 43.

It is to be noted that, while the quantization index arithmetic operation section 42 receives the activities, activity-1 to activity-k-1, and the sum total activity-sum of the activities outputted from the activity buffer section 73 as inputs thereto, they are hereinafter described.

At step S109, the quantization scale arithmetic operation section 43 calculates the quantization scale MQUANT-k based on the quantization index Q-k inputted from the quantization index arithmetic operation section 42 and the activity activity-k inputted from the activity buffer section 73 and outputs the quantization scale MQUANT-k to the quantization section 13.

Then, the counter counts as j=k+1 at step S110 in such a manner as described hereinabove, and the quantization scale determination section 18 repeats the processes at steps S106 to S109 to further calculate the quantization scale MQUANT-k+1.

It is to be noted that, where the motion vector residual bdv-k (k is an arbitrary number from 1 to mbcnt) calculated by the motion detection arithmetic operation section 33 is higher than a predetermined threshold value, the motion vector residual sum total arithmetic operation section 71 may calculate, in the process at step S103 described hereinabove, the sum total bdv-sum of the motion vectors using the threshold value as the value of the motion vector residual bdv-k and output the sum total bdv-sum of the motion vector residuals and the threshold value as the value of the motion vector bdv-k to the motion vector residual buffer section 72.

As described above, the third term of the right side of the expression (1) for calculating the virtual buffer occupation amount d-k of the conventional image coding apparatus 1 of FIG. 1 is a term of dividing the number (k-1) of those MBs which have been processed by the total number (mbcnt) of the MBs in the frame.

In contrast, the third term of the right side of the expression (3) given hereinabove for calculating the virtual buffer occupation amount d-k of the MB-k of the image coding apparatus 61 of FIG. 4, to which the present invention is applied, is a term of multiplying the distribution of the motion vector residuals by a weighted average.

Figure 6:
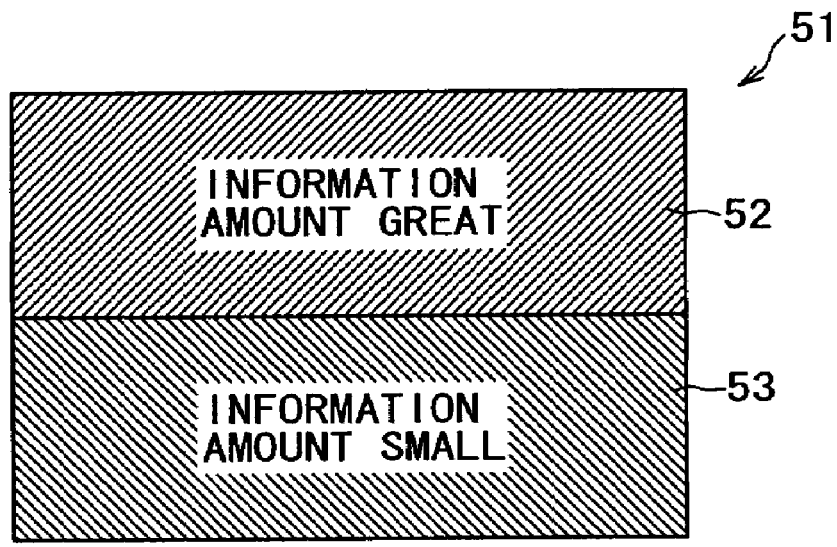
FIG. 6 is a view showing an example of a configuration of a frame similar to that of FIG. 2.

For example, it is assumed that the frame 51 of FIG. 6 (that is, a frame equivalent to the frame 51 of FIG. 2) is divided into totaling mbcnt MBs composed of an MB group 52 having a great information amount, that is, a great generation bit amount and another MB group 53 having a small generation bit amount.

Further, it is assumed that the data of the MB-1 to MB-mbcnt obtained by the conversion are coded by the image coding apparatus 61 of FIG. 4 to which the present invention is applied.

In this instance, the virtual buffer occupation amounts d-1 to d-mbcnt calculated using the expression (3) given hereinabove are represented by a curve 121 of FIG. 7.

Figure 7:
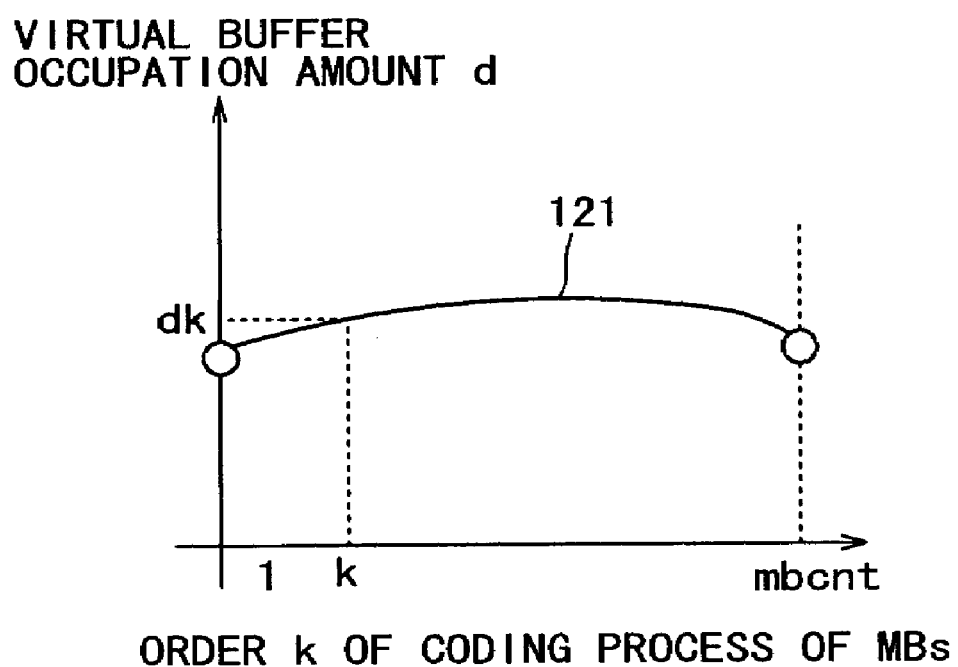
FIG. 7 is a view illustrating an example of a virtual buffer occupation amount of the frame of FIG. 6 calculated by the image coding apparatus of FIG. 4.

It is to be noted that the axis of ordinate and the axis of abscissa of FIG. 7 represent the virtual buffer occupation amount d and the order k of the coding process similarly to those of FIG. 3, respectively.

As indicated by the curve 121 of FIG. 7, each of the virtual buffer occupation amounts d-1 to d-mbcnt is calculated to a substantially uniform value.

In this manner, the image coding apparatus 61 of FIG. 4 can calculate the virtual occupation amounts d-1 to d-mbcnt individually absorbing the difference in the generation information amount (bit amount) among the MB-1 to MB-mbcnt.

Accordingly, the quantization index Q-k calculated based on the virtual buffer occupation amount d-k (k is an arbitrary number from 1 to mbcnt) can have a stabilized value independently of the value of k.

In other words, the quantization index for each MB calculated by the image coding apparatus 61 can be stabilized within the frame.

As a result, the image coding apparatus 61 of FIG. 4 can improve the visual perceptibility of an image, that is, the picture quality, compared with the image coding apparatus 1 of FIG. 1.

It is to be noted that, while, in the example described above, all of the MBs in the frame are formed from interMBs, the frame may include an MB which does not use a motion vector (such an MB is hereinafter referred to as intraMB).

For example, if the MBs in the frame are formed only from intraMBs, then the quantization index arithmetic operation section 42 of FIG. 4 may use, in the process at step S106 of FIG. 5 described hereinabove, not the motion vector residuals bdv-1 to bdv-k-1 (k is an arbitrary value from 1 to mbcnt) and the sum total bdv-sum of the motion vector residuals, but the activities activity-1 to activity-k-1 and the sum total activity-sum of the activities to calculate the virtual buffer occupation amount d-k.

In other words, bdv-sum_pk-1 in the expression (3) given hereinabove may be changed into activity-sum_pk-1 (sum total of the activities activity-1 to activity-k-1) while bdv-sum is changed into the activity-sum (sum total of the activities from activity-1 to activity-mbcnt).

On the other hand, where the MBs in the frame include interMBs and intraMBs in a mixed state, in the process at step S103, the motion vector residual sum total arithmetic operation section 71 of FIG. 4 may calculate the sum total bdv-sum of the motion vector residuals setting the motion vector residual bdv-k of the intraMB-k (k is an arbitrary number from 1 to mbcnt) to a predetermined fixed value and output the sum total bdv-sum of the motion vector residuals and the fixed value as a value of the motion vector residual bdv-k to the motion vector residual buffer section 72.

It is to be noted that the fixed value is preferably set to an approximately maximum value among the values of the motion vector residuals of the interMBs.

Further, in the process at step S106, the quantization index arithmetic operation section 42 may discriminate whether the MB-k is an interMB or an intraMB and, if it is discriminated that the MB-k is an interMB, use the motion vector residual, that is, substitute bdv-sum_pk-1 and bdv-sum into the expression (3) given hereinabove to calculate the virtual buffer occupation amount d-k.

On the other hand, when the quantization index arithmetic operation section 42 discriminates in the process at step S106 that the MB-k is an intraMB, it may use the activity, that is, substitute activity-sum_pk-1 and activity-sum into the expression (3) given hereinabove to calculate the virtual buffer occupation amount d-k.

In the series of processes described above, for example, where data of each frame are a picture of one of data of an I picture, data of a P picture and data of a B picture, when the data of the frames are inputted in a predetermined period (in the example of FIG. 8, 1/30 [s]) into the macro block division section 11 in such an order as given below, the data of the frames are coded in such an order as given below.

In the following description, an I picture is represented by I, a P picture by P and a B picture by B, and the order of the process of each picture is added to the right side.

Figure 8:
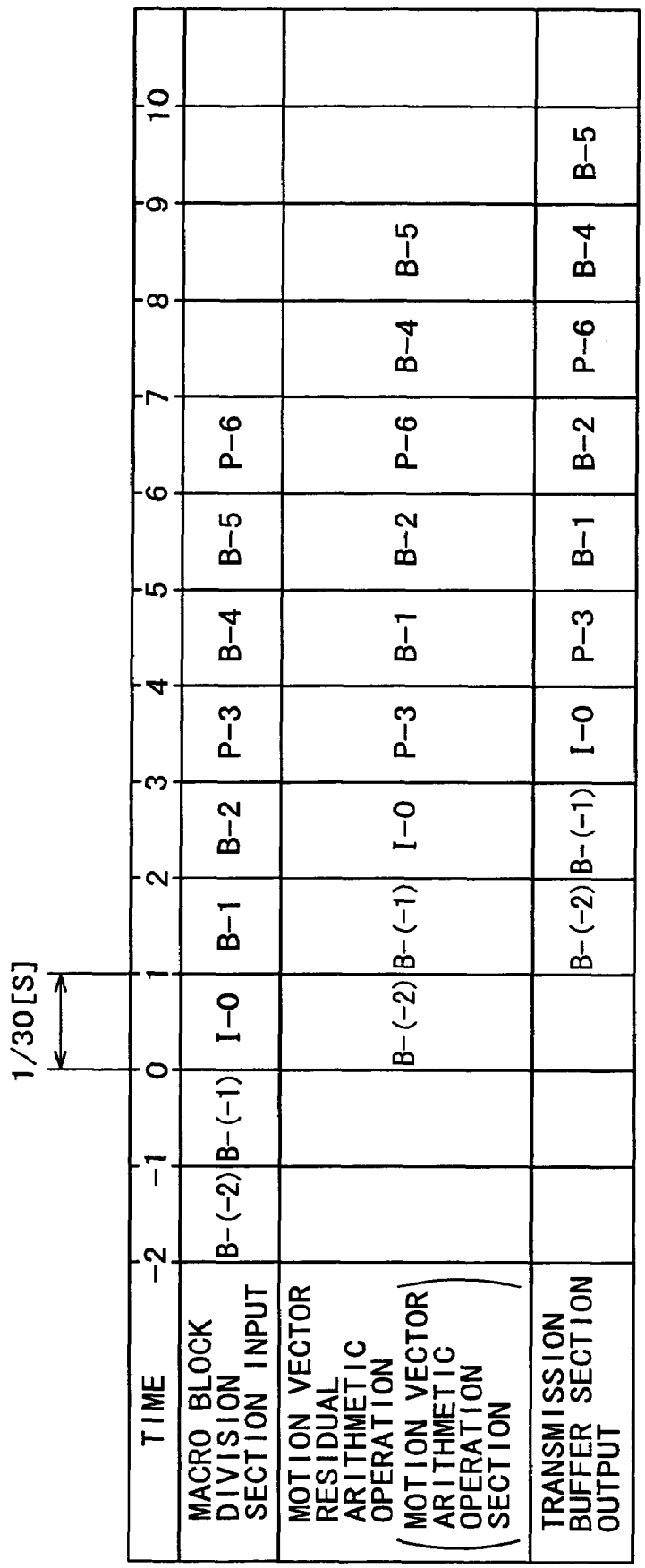
FIG. 8 is a view illustrating an order of a process of frames coded by the image coding apparatus of FIG. 4.

In particular, it is assumed that data of the frames are inputted to the macro block division section 11 in the order of (B-1 (-2), B-(-1), I-0, B-1, B-2, P-3, B-4, B-5, P-6, . . . ) as shown in FIG. 8. However, the time at which I-0 is inputted is used as a reference (0).

In this instance, at time 0, the motion detection arithmetic operation section 33 detects the motion vector of B-(-2) and calculates a motion vector residual. Thereafter, a motion vector is detected for each one frame in the following order, and a motion vector residual is calculated.

In particular, with reference to time 0, a motion vector is detected in the order of (B-(-2), B-(-1), I-0, P-3, B-1, B-2, P-6, B-4, B-5, . . . ) for each one frame, and a motion vector residual is calculated.

In this manner, prior to a B picture (for example, B-1 and B-2, B-4 and B-5, and so forth), a motion vector of a P picture (for example, P-3 with respect to B-1 and B-2, or P-3 with respect to B-4 and B-5) is detected and a motion vector residual is calculated.

Then, in the order wherein the motion vectors described above are detected and the motion vector residuals are calculated, that is, in the order of (B-(-2), B-(-1), I-0, P-3, B-1, B-2, P-6, B-4, B-5, . . . ), data of the frames are coded and outputted from the transmission buffer section 15 (in order words, before coding is performed, arithmetic operation of motion vectors and residuals of them necessary for such coding must be completed).

It is to be noted that the timing at which data of the frame of B-(-2) are coded and outputted from the transmission buffer section 15 is the time 1, and thereafter, data of the frames are processed and coded in the order described above for each frame.

While the series of processes described above can be executed by hardware, it may otherwise be executed by software. In this instance, for example, an image coding apparatus 131 is formed from such a personal computer as shown in FIG. 9.

Referring to FIG. 9, a CPU (Central Processing Unit) 141 executes various processes in accordance with a program stored in a ROM (Read Only Memory) 142 or a program having been loaded from a storage section 148 into a RAM (Random Access Memory) 143. In the RAM 143, also data necessary for the CPU 141 to execute various processes and so forth are stored suitably.

The CPU 141, ROM 142 and RAM 143 are connected to each other by a bus 144. Also an input/output interface 145 is connected to the bus 144.

An inputting section 146 comprising a keyboard, a mouse and so forth, an outputting section 147 comprising a display unit such as a CRT or an LCD unit and a speaker or the like, a storage section 148 formed from a hard disk or the like, and a communication section 149 formed from a modem, a terminal adapter or the like are connected to the input/output interface 145. The communication section 149 performs a communication process through a network including the Internet.

Also a drive 150 is connected to the input/output interface 145 as occasion demands, and a magnetic disk 161, an optical disk 162, a magneto-optical disk 163, a semiconductor memory 164 or the like is suitably loaded into the drive 150 and a computer program read out from those is installed into the storage section 148 as occasion demands.

Where the series of processes is executed by software, a program which constructs the software is installed from a network or a recording medium into a computer incorporated in hardware for exclusive use or, for example, a personal computer for universal use which can execute various functions by installing various programs.

The recording medium is formed as a package medium such as, as shown in FIG. 9, a magnetic disk 161 (including a floppy disk), an optical disk 162 (including a CD-ROM (Compact Disc-Read Only Memory) and a DVD (Digital Versatile Disk)), or a magneto-optical disk 163 (including an MD (Mini-Disk)), or a semiconductor memory 164 which has the program recorded thereon or therein and is distributed in order to provide the program to a user separately from an apparatus body. Else, the recording medium is formed as a ROM 142 having the program stored therein, a hard disk included in the storage section 148, or the like which are provided to a user in a state wherein they are incorporated in the apparatus body in advance.

It is to be noted that, in the present specification, the steps which describe the program stored in a recording medium may be but need not necessarily be processed in a time series in the order as described, and include processes which are executed in parallel or individually without being processed in a time series.

INDUSTRIAL APPLICABILITY

As described above, according to the image coding apparatus and method of the present invention, since a quantization index of a block is calculated based on a weighted average of a parameter representative of complicacy of the block, the picture quality of an image can be improved.

The invention claimed is:

1. An image coding apparatus for coding an image in a unit of a block comprises:
   first arithmetic operation means for calculating value of a parameter representative of complicacy of the block,
   wherein the first arithmetic operation means determines, when the value of the motion vector residual is higher than a predetermined threshold value set in advance, the threshold value as the value of the motion vector residual;
   storage means for storing the value of the parameter calculated by said first arithmetic operation means; and
   second arithmetic operation means for calculating a weighted average of the value of the parameter stored by said storage means and calculating a quantization index of the block based on the weighted average.

2. An image coding apparatus according to claim 1, wherein the parameter is an activity representative of complicacy of the block.

3. An image coding apparatus according to claim 1, wherein the parameter is a motion vector residual of the block.

4. An image coding apparatus according to claim 3, wherein said first arithmetic operation means determines, where the frame of the screen includes block which does not use a motion vector and block which uses a motion vector, a predetermined fixed value set in advance as the motion vector residual of the block which does not use a motion vector.

5. An image coding apparatus according to claim 1, wherein where the frame of the screen includes block which does not use a motion vector and block which uses a motion vector, said first arithmetic operation means calculates an activity of the block as the parameter of the block which does not use a motion vector, and calculates a motion vector residual of the block as the parameter of the block which uses a motion vector.

6. An image coding system comprising:

at least one processor; and at least one memory, coupled to the at least one processor, the at least one memory storing a method for an image coding apparatus which codes an image in a unit of a block, the method comprises:

a first arithmetic operation step of calculating value of a parameter representative of complicacy of the block, wherein the first arithmetic operation step determines, when the value of the motion vector residual is higher than a predetermined threshold value set in advance, the threshold value as the value of the motion vector residual;

a storage step of storing the value of the parameter calculated by the process at the first arithmetic operation step; and a second arithmetic operation step of calculating a weighted average of the value of the parameter stored by the process at the storage step and calculating a quantization index of the block based on the weighted average.

* * * * *